US008559970B2

(12) United States Patent
Lee

(10) Patent No.: US 8,559,970 B2
(45) Date of Patent: Oct. 15, 2013

(54) METHOD FOR PROVIDING LOCATION-BASED INFORMATION SERVICES, LOCATION-BASED INFORMATION SERVICES SYSTEM, AND PORTABLE ELECTRONIC DEVICE

(75) Inventor: Yung-Chao Lee, Taipei (TW)

(73) Assignee: Mitac International Corp., Hsinchu (TW)

( * ) Notice: Subject to any disclaimer, the term of this patent is extended or adjusted under 35 U.S.C. 154(b) by 489 days.

(21) Appl. No.: 12/644,944

(22) Filed: Dec. 22, 2009

(65) Prior Publication Data

US 2010/0159956 A1 Jun. 24, 2010

(30) Foreign Application Priority Data

Dec. 23, 2008 (TW) .............................. 097150212 A

(51) Int. Cl.
*H04W 88/02* (2009.01)
(52) U.S. Cl.
USPC ..................................................... 455/456.1
(58) Field of Classification Search
USPC ....................................... 455/456.1; 701/201
See application file for complete search history.

(56) References Cited

U.S. PATENT DOCUMENTS

| | | | | |
|---|---|---|---|---|
| 2003/0134648 A1* | 7/2003 | Reed et al. | .................... | 455/456 |
| 2003/0161335 A1* | 8/2003 | Fransdonk | .................... | 370/401 |
| 2006/0089160 A1* | 4/2006 | Othmer | ........................ | 455/457 |
| 2009/0132378 A1* | 5/2009 | Othmer et al. | .................. | 705/14 |
| 2010/0269028 A1* | 10/2010 | Othmer | ........................ | 715/205 |

\* cited by examiner

*Primary Examiner* — Diane Mizrahi

(74) *Attorney, Agent, or Firm* — Steptoe & Johnson LLP

(57) ABSTRACT

A method for providing location-based information services to a portable electronic device includes the steps of: providing an information platform and a user preference settings database for receiving and recording preference settings data of a user of the portable electronic device, respectively, the preference settings data including categories of information and location range; receiving positioning information from the portable electronic device using a positioning module; selecting location information from a location information database in accordance with the preference settings data recorded in the user preference settings database that corresponds to the positioning information received by the positioning module; and transmitting the selected location information to the portable electronic device. Since location-based information services are provided based on the preference settings data, the user receives only the location information that he or she prefers.

20 Claims, 3 Drawing Sheets

METHOD FOR PROVIDING LOCATION-BASED INFORMATION SERVICES, LOCATION-BASED INFORMATION SERVICES SYSTEM, AND PORTABLE ELECTRONIC DEVICE

CROSS-REFERENCE TO RELATED APPLICATION

This application claims priority of Taiwanese application no. 097150212, filed on Dec. 23, 2008.

BACKGROUND OF THE INVENTION

1. Field of the Invention

This invention relates to a method for providing location-based services, more particularly to a method of providing customized location-based services.

2. Description of the Related Art

Due to rapid advances in navigation services technologies, a conventional navigation device provides not only basic navigation functionality, but also two-way connected navigation functionality, which enables a server end to provide real-time location-based services to the navigation device, and a user to submit requests for desired location information to the server end. However, this two-way connected navigation functionality does not enable provision of the desired location information to the navigation device without the active participation of the user. In other words, the desired location information is not automatically provided to the navigation device.

Submitting such location information requests with the frequency required to stay abreast of emergent local phenomena such as typhoons or earthquakes is impracticable, and when such location information is not received in a timely manner, the usefulness of such information is limited. Moreover, the location information provided of ten contains content that is not of interest to the user, and is associated with an administrative district that is larger than that of interest to the user.

SUMMARY OF THE INVENTION

Therefore, the main object of the present invention is to provide a method for providing location-based information services that can be based on a relatively small geographical location.

Another object of the present invention is to provide a location-based information services system and a portable electronic device capable of providing location-based information services that can be based on a relatively small geographical location as specified in user preference settings, and capable of overcoming the drawbacks of the prior art.

To achieve the aforementioned objects, according to one aspect of the present invention, there is provided a location-based information services system that is adapted for providing location-based information services to a portable electronic device, and that includes a positioning module, an information platform, a user preference settings database, a location information database, an information transmission module, a condition database, and a condition module. The method for providing location-based information services of this invention includes the steps of:

(a) providing an information platform and a user preference settings database for receiving and recording preference settings data of a user of the portable electronic device, respectively, the preference settings data including categories of information and location range;

(b) setting and storing at least one condition for triggering information services provision to the portable electronic device in a condition database;

(c) receiving positioning information that includes a location of the portable electronic device by having a positioning module; and (d) determining whether the at least one condition for triggering information services provision stored in the condition database has been met by a condition module, and when it is determined that the condition has been met, accessing the preference settings data that corresponds to the positioning information, selecting location information from a location information database in accordance with the preference settings data accessed from the user preference settings database, and transmitting the selected location information to the portable electronic device.

In an embodiment of the invention, in step (a), the information platform first receives and confirms login information including identification data or phone number data associated with the portable electronic device, and then receives the preference settings data corresponding to the login information; and in step (c), the positioning information further includes the login information.

In an embodiment of the invention, the login information is received by the information platform through the Internet from a computer connected to the Internet.

In an embodiment of the invention, the at least one condition for triggering information services provision includes at least one of the following conditions: the location included in the positioning information is determined for a first time within a time period to correspond to a service area location of a base station; a specified point in time subsequent to receipt of the positioning information is determined to have been reached; and the location included in the positioning information is determined to correspond to a specified location, and a specified local event is determined to be associated with the specified location.

Preferably, in step (c), the positioning information of the portable electronic device is obtained through satellite positioning technology or a positioning technology of a base station.

In an embodiment of the invention, in step (d), the selected location information is first sent to a base station that has a service area location corresponding to the location of the portable electronic device, and is then sent from the base station to the portable electronic device.

Preferably, in step (d), the selected location information is transmitted to the portable electronic device through a wireless network such as one conforming with the IEEE802.11 standard.

The method for providing location-based information services of the present invention enables a user of a portable electronic device that supports communications to receive real-time location-based information services based on user preferences.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
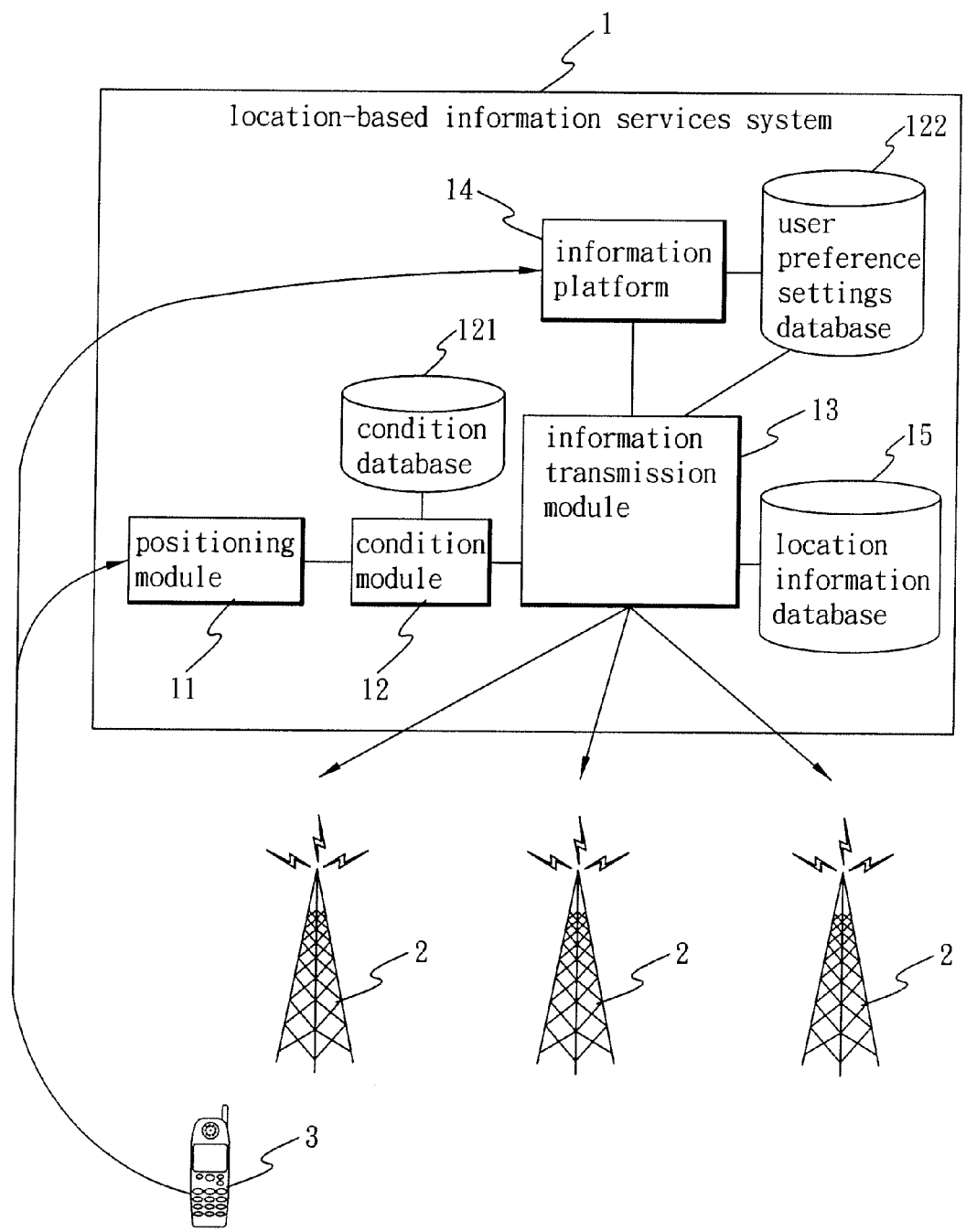
FIG. 1 is a schematic circuit block diagram of a preferred embodiment of a location-based information services system according to the present invention.

FIG. 1 illustrates the preferred embodiment of a location-based information services system 1 adapted for providing location-based information services to a portable electronic device 3. In this embodiment, the location-based information services system 1 is a remote server capable of communicating with a plurality of base stations 2, and includes a positioning module 11, a condition database 121, a condition module 12, an information transmission module 13, an information platform 14, a user preference settings database 122, and a location information database 15.

The positioning module 11 is for receiving positioning information that includes a location of the portable electronic device 3. The information platform 14 is for receiving preference settings data of a user of the portable electronic device 3, the preference settings data including categories of information and location range. The user preference settings database 122 is coupled to the information platform 14 for recording the preference settings data. The location information database 15 is for storing multiple entries of location information that are updated in real-time. The information transmission module 13 is coupled to the user preference settings database 122 and the location information database 15, and is for accessing preference settings data recorded in the user preference settings database 122 that corresponds to the positioning information received by the positioning module 11, and selecting the location information from the location information database 15 in accordance with the preference settings data recorded in the user preference settings database 122, and transmitting the selected location information to the portable electronic device 3. The condition database 121 is for setting and storing at least one condition for triggering information services provision to the portable electronic device 3. The condition module 12 is coupled to the information transmission module 13, the positioning module 11, and the condition database 121 for determining whether the condition has been met, and controlling the information transmission module 13 to provide information services to the portable electronic device 3 when it is determined that the condition has been met. In this embodiment, the positioning module 11, the condition module 12, and the information platform are realized through corresponding proprietary software programs. A processor of the remote server is configured to access and execute the software programs so that the positioning module 11, the condition module 12, and the information platform 14 have corresponding functionality.

Figure 3:
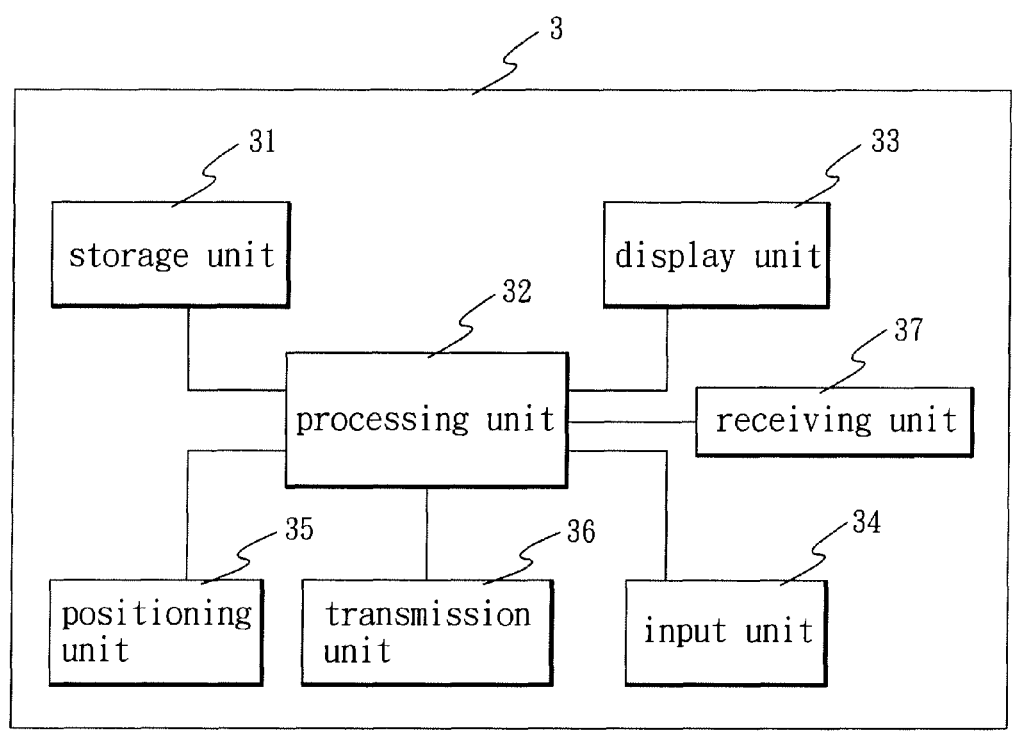
FIG. 3 is a schematic circuit block diagram of a preferred embodiment of a portable electronic device according to the present invention.

Referring to FIG. 3, the portable electronic device 3 is adapted for receiving location-based information services from the location-based information services system 1, and can be a mobile phone, a personal navigation device (PND), a personal digital assistant (PDA), etc. The portable electronic device 3 includes: a storage unit 31 for storing a preference setup program; a processing unit 32 coupled to the storage unit 31 for accessing and executing the preference setup program, and providing an operations interface; a display unit 33 coupled to the processing unit 32 for displaying the operations interface; an input unit 34 coupled to the processing unit 32 and operable for inputting the preference settings data associated with the operations interface; a positioning unit 35 coupled to the processing unit 32 and adapted to cooperate with a satellite or a base station for generating the positioning information, the positioning information including coordinates that indicate the location of the portable electronic device 3; a transmission unit 36 coupled to the processing unit 32 for transmitting the preference settings data and the positioning information to the location-based information services system 1; and a receiving unit 37 coupled to the processing unit 32 for receiving the selected location information from the location-based information services system 1, the selected location information received by the receiving unit 37 being sent to the display unit 33 for display.

It should be noted that implementations of the display unit 33 and the input unit 34 are not limited to specific forms. The display unit 33 and the input unit 34 can be implemented in combination as a touch-control display, or separately as a display device and a keyboard, respectively. In addition, the implementation of the transmission unit 36 and the receiving unit 37 can be dependent on or independent of the transmission technology of the portable electronic device 3. In this embodiment, the transmission unit 36 and the receiving unit 37 are implemented in combination as a wireless signal transceiver.

When the user operates the portable electronic device 3 to input the preference settings data, the processing unit 32 accesses and executes the preference setup program stored in the storage unit 31, and generates the operation interface (not shown), which is displayed on the display unit 33. The operation interface includes options for selecting the categories of information, such as weather and traffic conditions and local events, and an option for selecting the location range, which specifies a geographical location surrounding the location of the portable electronic device 3 about which the user wishes to receive information in message form. For example, the location range can be the geographical locations defined by administrative districts such as a city, county and state. A user can select such location range through specifying a radius distance from the location of the portable electronic device 3. The user inputs this preference settings data using the input unit 34. This preference settings data is then recorded in a specific transmission format for subsequent transmission by the transmitting unit 36.

Therefore, when the user selects the information categories pertaining to weather and traffic conditions, and specifies the radius distance of 10 kilometers, this indicates that the user wishes to receive the weather and traffic conditions for the geographical location within a 10-kilometer radius of the location of the portable electronic device 3.

The transmitting unit 36 of the portable electronic device 3 then transmits the preference settings data to the information platform 14 of the location-based information services system 1, preferably through one of a telephone network, a wireless network and the Internet, and the preference settings data is recorded in the user preference settings database 122 for subsequent use. The transmitting unit 36 also sends the positioning information to the positioning module 11 of the location-based information services system 1.

The receiving unit 37 of the portable electronic device 3 is used to receive the selected location information that is sent from the location-based information services system 1. The location information received by the receiving unit 37 is then sent to the display unit 33 for display.

The positioning module 11 of the location-based information services system 1 receives the positioning information from the portable electronic device 3. The manner in which the positioning module 11 obtains the positioning information can be decided by one implementing this invention. For instance, the positioning module 11 can use satellite positioning technology (that is, GPS) or positioning technology of a base station to receive the positioning information from a portable electronic device that may or may not support GPS functionality.

In this embodiment, the condition database 121 of the location-based information service system 1 stores the following conditions: the location included in the positioning information is determined for a first time within a time period to correspond to a service area location of a base station; a specified point in time subsequent to receipt of the positioning information is determined to have been reached; and the location included in the positioning information is determined to correspond to a specified location, and a specified local event (especially an emergency) is determined to be associated with the specified location.

In this embodiment, the condition module 12 determines whether any of the conditions has been met based on the time of receipt of the positioning information by the positioning module 11, the location included in the positioning information, current local time, and real-time local news information available through a real-time news source (such as a local information center, not shown) with which the condition module 12 preferably has a connection. Through this connection with the real-time news source, the condition module 12 determines the specified local event associated with the specified location.

When it is determined that at least one of the conditions has been met, the information transmission module 13 accesses preference settings data recorded in the user preference settings database 122 that corresponds to the positioning information received by the positioning module 11, and selects the location information from the location information database 15 in accordance with the preference settings data accessed from the user preference settings database 122. In this embodiment, the multiple entries of the location information are updated in real-time through a connection the location information database 15 has with the real-time news source, and are stored in the location information database 15 according to the geographical location, that is, according to the location range. The information transmission module 13 then transmits the selected location information to the portable electronic device 3 through a wireless network. Alternatively, the information transmission module 13 can send the selected location information to the base station 2 having a service area location corresponding to the location of the portable electronic device 3, and the selected location information is subsequently sent from the base station 2 to the portable electronic device 3.

Preferably, the information platform 14 receives and confirms login information including identification data or phone number data associated with the portable electronic device 3 prior to receiving the preference settings data, the preference settings data corresponds to the login information, and the positioning information received by the positioning module 11 further includes the login information. The login information can be received by the information platform 14 from the portable electronic device 3 through one of a telephone network, a wireless network, and the Internet. Moreover, the login information can be received by the information platform 14 through the Internet from a computer connected to the Internet.

Therefore, when the positioning information of the portable electronic device 3 is received by the positioning module 11 and sent to the condition module 12, and the condition module 12 sends the positioning information to the information transmission module 13 when the condition has been met, the information transmission module 13 can then use the login information included in the positioning information to determine the corresponding preference settings data, and to select the location information from the location information database 15 in accordance with the preference settings data determined thereby.

Figure 2:
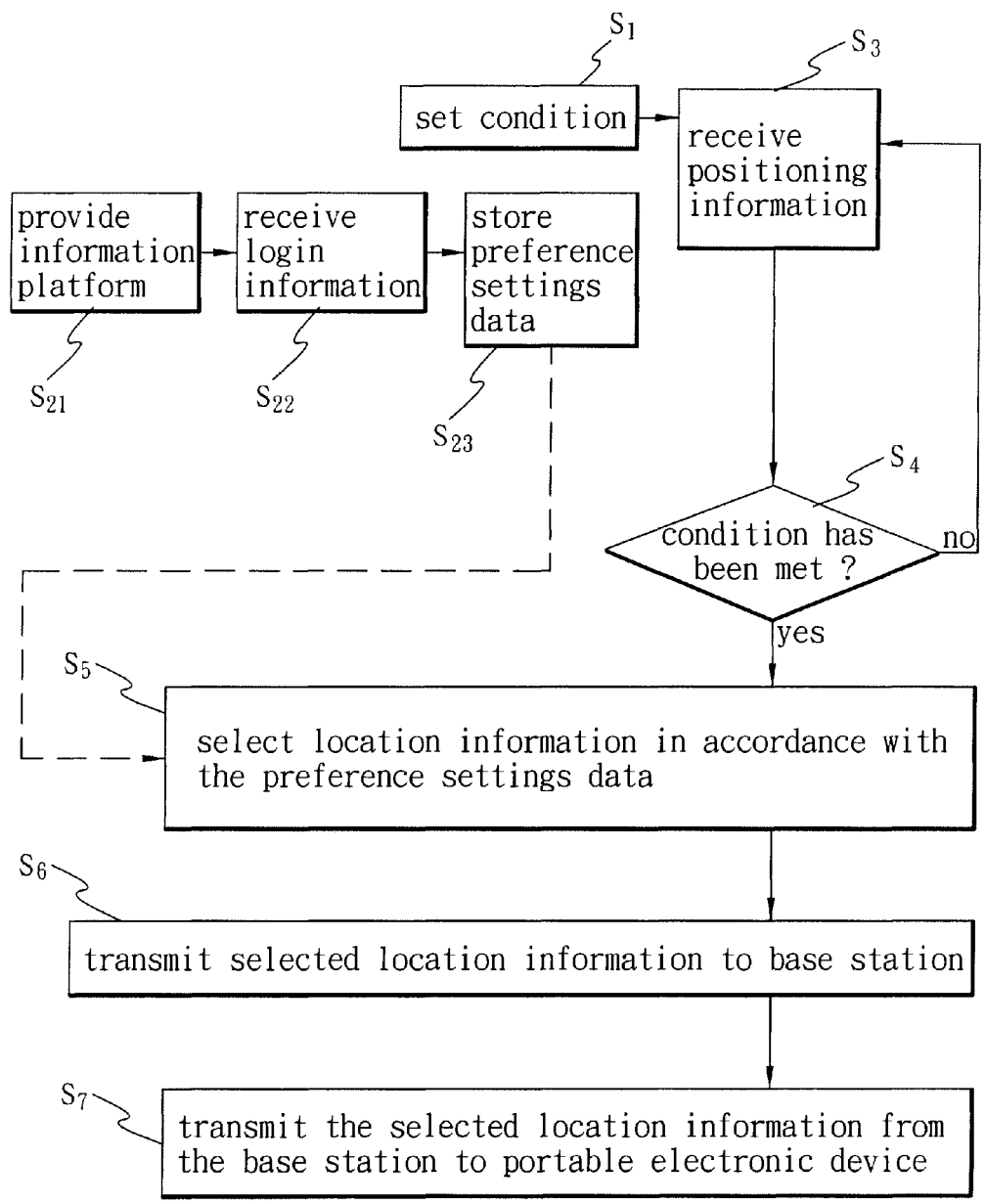
FIG. 2 is a flowchart to illustrate a preferred embodiment of a method for providing location-based information services according to the present invention.

Referring to FIG. 2, the method for providing location-based information services of this embodiment comprises the following steps.

In step $S_1$, the location-based information services system 1 sets and stores the conditions for triggering information provision to the portable electronic device 3 in the condition database 121.

In step $S_{21}$, the location-based information services system 1 provides the information platform 14.

In step $S_{22}$, the information platform 14 of the location-based information services system 1 first receives and confirms the login information that includes identification data or phone number data associated with the portable electronic device 3 from the portable electronic device 3 or from the computer (not shown).

In step $S_{23}$, the information platform 14 of the location-based information services system 1 receives the preference settings data corresponding to the login information, and the preference settings data is recorded in the user preference settings database 122.

In step $S_3$, the positioning module 11 receives the positioning information of the portable electronic device 3, which includes both the location and the login information of the portable electronic device 3.

In step $S_4$, the condition module 12 determines whether at least one of the conditions for triggering information services provision that are stored in the condition database 121 has been met. When it is determined that at least one of the conditions has been met, the flow proceeds to step $S_5$. Otherwise, the flow returns to step $S_3$.

In step $S_5$, the information transmission module 13 accesses preference settings data recorded in the user preference settings database 122 that corresponds to the positioning information received by the positioning module 11, and selects the location information from the database 15 in accordance with the preference settings data accessed from the user preference settings database 122. For example, if the preference settings data indicates that the location range is the geographical location within a 10-kilometer radius of the location of the portable electronic device 3, the information transmission module 13 selects the location information from the location information database 15 in accordance with this location range, the location included in the positioning information, and the selected information categories.

In step $S_6$, the information transmission module 13 sends the selected location information to the base station 2 having a service area location corresponding to the location of the portable electronic device 3.

In step $S_7$, the base station 2 sends the selected location information to the portable electronic device 3.

It should be noted that, in other embodiments, the information transmission module 13 can be configured to send the selected location information directly to the portable electronic device 3 rather than via the base station 2, thus replacing steps $S_6$ and $S_7$ with a single step.

In sum, the location-based information services system 1 of the present invention uses the stored conditions, the recorded preference settings data including the location range, and the received positioning information to automatically send customized location information to the user.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for providing location-based information services to a portable electronic device, said method comprising the steps of:
   (a) providing an information platform and a user preference settings database for respectively receiving and recording preference settings for categories of information and location range from a user of the portable electronic device;
   (b) setting and storing in a condition database at least one condition for triggering information services provision to the portable electronic device;
   (c) receiving positioning information that includes a location of the portable electronic device by having a positioning module; and
   (d) determining through use of a condition module whether the at least one condition for triggering information services provision stored in the condition database has been met, and when the condition has been met, selecting location information from a location information database in accordance with the positioning information and the preference settings for categories of information and location range, and
   transmitting the selected location information to the portable electronic device.

2. The method for providing location-based information services as claimed in claim 1, wherein the at least one condition for triggering information services provision includes at least one of the following conditions:
   the location included in the positioning information is determined for a first time within a time period to correspond to a service area location of a base station;
   a specified point in time subsequent to receipt of the positioning information is determined to have been reached; and
   the location included in the positioning information is determined to correspond to a specified location, and a specified local event is determined to be associated with the specified location.

3. The method for providing location-based information services as claimed in claim 2, wherein the specified local event associated with the specified location is determined by the condition module through real-time local event news information available through a real-time news source.

4. The method for providing location-based information services as claimed in claim 1, wherein the location information database stores multiple entries of the location information that are updated in real-time, and the multiple entries of the location information are stored in the location information database according to geographical location.

5. The method for providing location-based information services as claimed in claim 1, wherein:
   in step (a), the information platform first receives and confirms login information including identification data or phone number data associated with the portable electronic device, and then receives the preference settings corresponding to the login information; and
   in step (c), the positioning information further includes the login information.

6. The method for providing location-based information services as claimed in claim 5, wherein the login information is received by the information platform from the portable electronic device through one of a telephone network, a wireless network and the Internet.

7. The method for providing location-based information services as claimed in claim 5, wherein the login information is received by the information platform through the Internet from a computer connected to the Internet.

8. The method for providing location-based information services as claimed in claim 1, wherein, in step (d), the selected location information is first sent to a base station that has a service area location corresponding to the location of the portable electronic device, and is then sent from the base station to the portable electronic device.

9. The method as claimed in claim 1, wherein the categories of information include at least one of weather condition, traffic condition, or local event, and the location range is a user-specified range from the portable electronic device.

10. A location-based information services system adapted for providing location-based information services to a portable electronic device, said location-based information services system comprising:
    a positioning module for receiving positioning information that includes a location of the portable electronic device;
    an information platform for receiving preference settings of a user of the portable electronic device, the preference settings being specified by the user;
    a user preference settings database coupled to said information platform for recording the preference settings for categories of information and location range;
    a location information database for storing multiple entries of location information that are updated in real-time;
    an information transmission module coupled to said user preference settings database and said location information database, for selecting the location information from said location information database in accordance with the positioning information and the preference settings for categories of information and location range, and for transmitting the selected location information to the portable electronic device;
    a condition database for storing at least one condition for triggering information services provision to the portable electronic device; and
    a condition module coupled via a processor to said information transmission module, said positioning module, and said condition database for determining from the positioning information whether said at least one condition stored in said condition database has been met, and controlling said information transmission module to provide information services to the portable electronic device when said at least one condition has been met.

11. The location-based information services system as claimed in claim 10, wherein the at least one condition for triggering information services provision includes at least one of the following conditions:
    the location included in the positioning information is determined for a first time within a time period to correspond to a service area location of a base station;
    a specified point in time subsequent to receipt of the positioning information is determined to have been reached; and the location included in the positioning information is determined to correspond to a specified location, and a specified local event is determined to be associated with the specified location.

12. The location-based information services system as claimed in claim 11, wherein said condition module determines the specified local event associated with the specified location through real-time local event news information available through a real-time news source.

13. The location-based information services system as claimed in claim 10, wherein the multiple entries of the location information are stored in said location information database according to geographical location.

14. The location-based information services system as claimed in claim 10, wherein said information platform further receives and confirms login information including identification data or phone number data associated with the portable electronic device prior to receiving the preference settings, the preference settings corresponds to the login information, and the positioning information received by said positioning module further includes the login information.

15. The location-based information services system as claimed in claim 14, wherein the login information is received from the portable electronic device by said information platform through one of a telephone network, a wireless network and the Internet.

16. The location-based information services system as claimed in claim 14, wherein the login information is received by said information platform through the Internet from a computer connected to the Internet.

17. The location-based information services system as claimed in claim 10, wherein said information transmission module first sends the selected location information to a base station that has a service area location corresponding to the location that is included in the positioning information of the portable electronic device, the selected location information being subsequently sent from the base station to the portable electronic device.

18. The location-based information services system as claimed in claim 10, wherein the categories of information include at least one of weather condition, traffic condition, or local event, and the location range is a user-specified range from the portable electronic device.

19. A portable electronic device adapted for receiving location-based information services from a location-based information services system, said portable electronic device comprising:

a storage unit for storing a preference setup program;

a processor coupled to said storage unit for accessing and executing the preference setup program, and providing an operations interface;

a display coupled to said processor for displaying said operations interface;

an input unit coupled to said processor and operable for inputting preference settings data for categories of information and location range, wherein the preference settings are associated with said operations interface and are specified by a user of said portable electronic device;

a positioning unit coupled to said processor and adapted to generate positioning information associated with a location of said portable electronic device;

a transmission unit coupled to said processing unit for transmitting the preference settings and the positioning information to the location-based information services system; and a receiving unit coupled to said processor for receiving location information from the location-based information services system, the location information being selected by the location-based information services system in accordance with both the positioning information and the preference settings for categories of information and location range, the location information received by said receiving unit being sent to said display for display.

20. The portable electronic device as claimed in claim 19, wherein the categories of information include at least one of weather condition, traffic condition, or local event, and the location range is a user-specified range from the portable electronic device.

* * * * *